United States Patent
Fechner et al.

(10) Patent No.: US 10,823,636 B2
(45) Date of Patent: Nov. 3, 2020

(54) METHOD AND APPARATUS FOR THE DETERMINATION OF THE INDEX OF REFRACTION OF LENS MATERIAL

(71) Applicant: Novartis AG, Basel (CH)

(72) Inventors: Susanne Fechner, Aschaffenburg (DE); Roger Biel, Aschaffenburg (DE); Marcus Heift, Aschaffenburg (DE); Thomas Tonn, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 115 days.

(21) Appl. No.: 16/223,719

(22) Filed: Dec. 18, 2018

(65) Prior Publication Data

US 2019/0195730 A1 Jun. 27, 2019

Related U.S. Application Data

(60) Provisional application No. 62/608,635, filed on Dec. 21, 2017.

(51) Int. Cl.
| | |
|---|---|
| *G01M 11/02* | (2006.01) |
| *G01J 9/00* | (2006.01) |
| *G01B 9/02* | (2006.01) |
| *G01N 21/45* | (2006.01) |
| *G01B 11/24* | (2006.01) |
| *G01N 21/958* | (2006.01) |
| *G02C 7/04* | (2006.01) |

(52) U.S. Cl.
CPC ..... *G01M 11/0228* (2013.01); *G01B 9/02091* (2013.01); *G01B 11/2441* (2013.01); *G01J 9/00* (2013.01); *G01M 11/0271* (2013.01); *G01N 21/45* (2013.01); *G01N 2021/9583* (2013.01); *G02C 7/04* (2013.01)

(58) Field of Classification Search
CPC ............. G01B 9/0209; G01B 9/02091; G01M 11/0228; G01M 11/0271; G02C 7/04; G01N 21/45; G01N 2021/9583
See application file for complete search history.

(56) References Cited

U.S. PATENT DOCUMENTS

| | | | |
|---|---|---|---|
| 2013/0342811 A1* | 12/2013 | Warm | G01B 9/02091 351/206 |
| 2014/0092395 A1 | 4/2014 | Fechner et al. | |
| 2014/0253907 A1 | 9/2014 | Ignatovich et al. | |

(Continued)

FOREIGN PATENT DOCUMENTS

EP 3059575 8/2016

*Primary Examiner* — Michael A Lyons
(74) *Attorney, Agent, or Firm* — Patrick M. Ryan

(57) ABSTRACT

Method for determining the refractive index (n) of a material of a contact lens, in particular of a soft contact lens, the contact lens (1) having a first surface and a second surface defining a lens geometry there between, by measuring the wavefront issued by the contact lens (1) with a wavefront sensor (4), obtaining data of the geometry of at least one section of the contact lens (1) with an optical coherence tomography system (3) and communicating the geometry of the at least one section of the contact lens (1) from the optical coherence tomography system (3) to an analyzer, particularly a computer, and determining the refractive index (n) of the material of the contact lens from the geometry of the at least one section of the contact lens and from the wavefront issued by the contact lens (1).

4 Claims, 1 Drawing Sheet

(56) References Cited

U.S. PATENT DOCUMENTS

2016/0054195 A1    2/2016  Greivenkamp, Jr. et al.
2016/0356707 A1*  12/2016  Sugimoto .......... G01N 21/4133
2016/0363531 A1*  12/2016  Sugimoto .......... G01M 11/0271

* cited by examiner

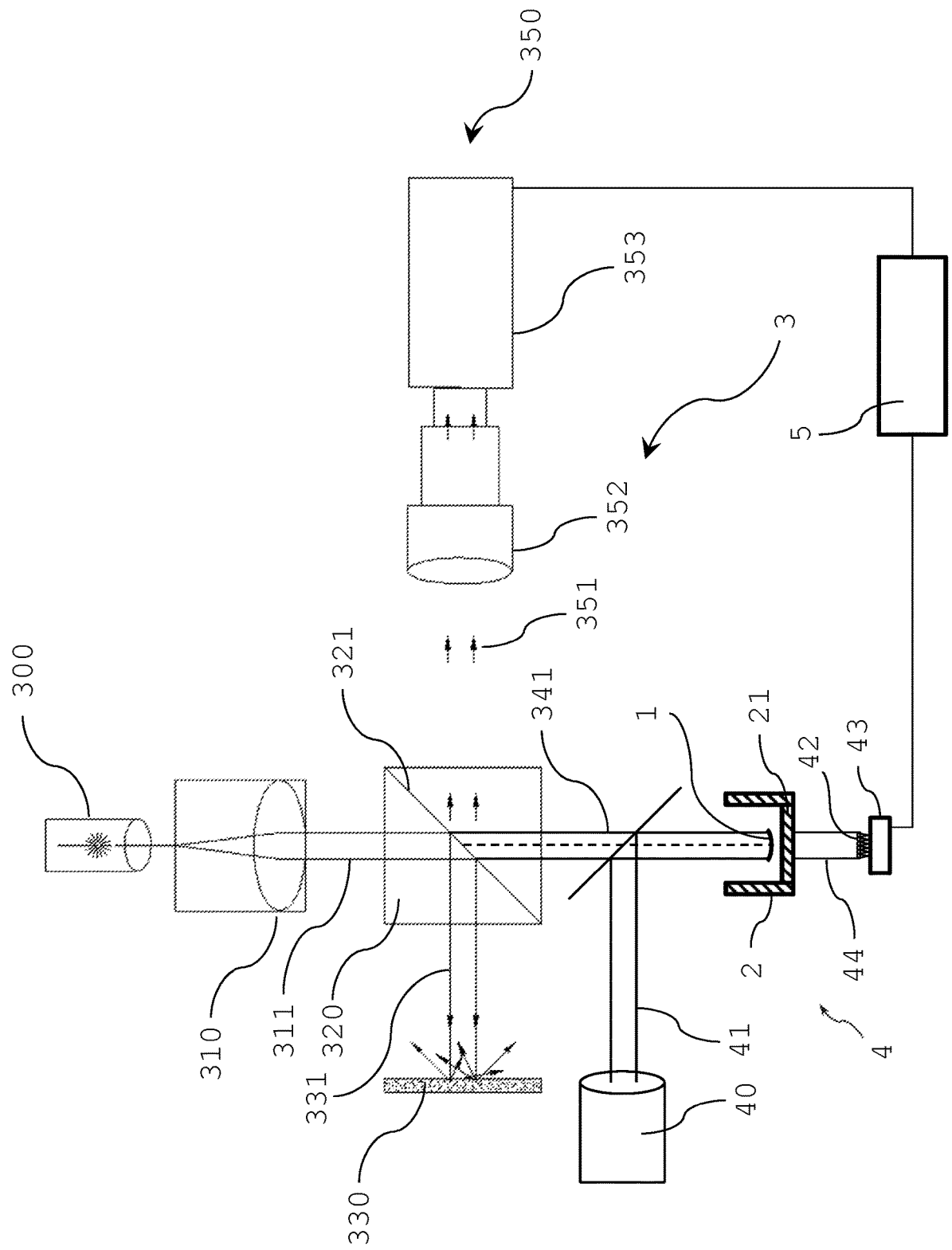

METHOD AND APPARATUS FOR THE DETERMINATION OF THE INDEX OF REFRACTION OF LENS MATERIAL

This application claims the benefits under 35 USC 119(e) of United States provisional application serial number 62/608,635 filed on Dec. 21, 2017, incorporated herein by reference in its entirety.

The present invention relates to the determination of the refractive index of a lens material of a contact lens.

BACKGROUND

In the manufacturing of lenses, obtaining very accurate measurements of the refractive index of the lens material is a challenging problem. This is particularly the case for coated lenses or lenses having a high wettability, leading to a strong water gradient at the surface of the contact lens. The inspected surface of the contact lens may be provided with a hydrophilic coating for enhancing the hydrophilicity and hence the wettability of the contact lens. The more fluid is absorbed within the contact lens at the front or back surface the more the refractive index of the inspected segment of the front surface or of the back surface of the contact lens will resemble the refractive index of the surrounding fluid, hence leading to strong gradients in the refractive index between the lens core and the lens surface. The measurement of the refractive index of the lens material is therefore not possible in an accurate manner by conventional methods.

It is known in the art to determine the central thickness of a contact lens and to measure the light wavefront passing through the contact lens using a Shack-Hartmann sensor. Various parameters of the contact lens, such as the focal distance, are calculated from the combination of the central thickness and from the light wavefront.

However, such method lacks accuracy for the determination of the refractive index of the contact lens material, in particular for lenses having complex shape, for example non-symmetrical shapes. In circumstances where the surfaces of the lens cannot be accurately described by two perfect intersecting spheres, approximating corrections must be included in the algorithm executed by the computer, to account for the deviations from perfect spheres, thereby reducing the accuracy of the method.

Hence, there remains an unmet need for a measurement method and apparatus that enables the accurate determination of the refractive index of the material of the contact lens.

SUMMARY

Throughout the entire specification including the appended claims, the singular forms "a", "an", and "the" include the plural, unless the context explicitly dictates otherwise. Also, whenever features are combined with the term "or", the term "or" is to be understood to also include "and" unless it is evident from the specification that the term "or" must be understood as being exclusive.

The present invention suggests a method for determining the refractive index of a material of a contact lens (or of a contact lens respectively), in particular of a soft contact lens, the contact lens having a first surface and a second surface defining a lens geometry there between, the method comprising the steps of (in this order):

a) providing a lens holder comprising an optically transparent bottom and containing the contact lens, in particular immersed in a liquid, b) providing a wavefront sensor, the wavefront sensor comprising a light source and a detector for receiving light coming from the light source and having passed through the contact lens contained in the lens holder and impinging on the detector, thus generating signals at the detector measuring the wavefront issued by the contact lens with the wavefront sensor, c) providing an optical coherence tomography system and obtaining data of the geometry of at least one section of the contact lens with the optical coherence tomography system, d) communicating the measured wavefront from the wavefront sensor and the data of the geometry of the at least one section (S) of the contact lens from the optical coherence tomography system to an analyzer, particularly a computer, e) determining the refractive index of the material of the contact lens from the data of the geometry of the at least one section of the contact lens and from the wavefront issued by the contact lens.

In a further aspect of the method according to the invention, in step e) a three dimensional geometry of the at least one section of the contact lens is obtained from the data of the geometry from the optical coherence tomography system, particularly starting from an approximated refractive index of the material of the contact lens, for determining the refractive index.

According to a further aspect of the method according to the invention, the contact lens comprises an optical zone and a peripheral zone and in step c) the at least one section of the contact lens comprises the optical zone of the contact lens.

According to a still further aspect of the method according to the invention, determining the refractive index of the material of the contact lens in step e) is performed by using a lensmaker's formula adapted to the contact lens geometry.

In particular, determining the refractive index of the material of the contact lens in step e) is performed by using formula (1)

$$\frac{1}{f} = (n-1)\left[\frac{1}{R_1} - \frac{1}{R_2} + \frac{(n-1)d}{nR_1R_2}\right] \quad (1)$$

where
f is the focal length of the lens,
n is the refractive index of the lens material,
$R_1$ is the radius of curvature of the lens surface closer to the light source,
$R_2$ is the radius of curvature of the lens surface farther from the light source, and
d is the thickness of the lens (the distance along the lens axis between the two surface vertices)

Still in accordance with another aspect of the method according to the invention, determining the refractive index of the material of the contact lens in step e) comprises the steps of (in this order):

e1) obtaining the three dimensional geometry of the at least one section of the contact lens (1) is performed by a calculation using an approximation of the refractive index (n), e2) calculating the theoretical wavefront of the light passing through the contact lens in the at least one section of the contact lens (1) on basis of the three dimensional geometry of the at least one section of the contact lens (1) obtained in step e1) using a wavefront simulation e3) comparing the theoretical wavefront obtained in step e2) and the measured wavefront obtained in step b) in the at least one section and calculating a parameter of deviation of the theoretical wave front from the measured wavefront in the at least one section (S) of the contact lens (1), the parameter of deviation being an indication of the accuracy of the determined refractive index, e4) incrementally adjusting the approximated refractive index (n) and reiterating the steps e1) to e3) until the parameter of deviation passes a predetermined threshold value.

Depending on the parameter of deviation chosen for the comparison of the wavefronts, the approximated refractive index is incrementally adjusted and the steps e1) to e3) reiterated until the parameter of deviation exceeds or goes below a predetermined threshold value.

In accordance with a further aspect of the method according to the invention, the step of providing the wavefront sensor in step b) comprises providing a Shack-Hartmann wavefront sensor comprising a light source, a plurality of lenslets, and a sensor array, the light source being configured to emit a beam of light and directing the beam of light through the contact lens.

According to a further aspect of the method according to the invention, providing a lens holder comprises providing a cuvette for holding the contact lens.

According to an additional aspect of the method according to the invention, measuring the wavefront and obtaining the data of the geometry of the contact lens are performed simultaneously or subsequently to one another in any order.

According to a still further aspect of the method according to the invention, the step of measuring the wavefront and/or obtaining data of the geometry of at least one section of the lens further comprises installing the lens in the inner volume of the cuvette containing a liquid medium.

Still in accordance with another aspect of the method according to the invention, the cuvette has a concave inner surface against which the contact lens rests in the liquid medium.

In accordance with a further aspect of the method according to the invention, measuring the wavefront issued by the contact lens with the wavefront sensor and obtaining the data of the geometry of at least one section of the contact lens with the optical coherence tomography system is done in the same lens holder.

According to a further aspect of the method according to the invention, the light beam of the optical coherence tomography system has a different wavelength from the wavelength of the beam from the light source of the Shack-Hartmann wavefront sensor.

Another aspect of the invention relates to an apparatus for determining a refractive index of a material of a contact lens, in particular of a soft contact lens, the apparatus comprising:
a) an optical coherence tomography system configured to obtain data of the geometry of the contact lens;
b) a wavefront sensor comprising a light source and a sensor array; the light source being configured to emit a beam of light which is directed through the contact lens and onto the sensor array, the wavefront sensor being adapted to measure the wavefront of the light beam having passed through the contact lens; and
c) an analyzer configured to determine the refractive index of the material of the contact lens from the data of the geometry of the contact lens and from the wavefront of the light beam having passed through the contact lens.

Particularly, the apparatus comprising a lens holder comprising an optically transparent bottom for receiving the contact lens, in particular immersed in a liquid.

In particular, the optical coherence tomography system is configured to obtain a three dimensional geometry of the at least part of the contact lens, in particular comprising the optical zone of the contact lens.

In another aspect of the apparatus according to the invention, the analyzer is configured to determine the refractive index of the contact lens by using a lensmaker's formula adapted to the contact lens geometry.

According to a further aspect of the apparatus according to the invention, the analyzer is configured to determine the refractive index of the contact lens by (in this order)
i) obtaining a three dimensional geometry of the at least one section of the contact lens is performed by a calculation using an approximation of the refractive index,
ii calculating the theoretical wavefront of the light having passed through the contact lens in the at least one section of the contact lens using a simulation on basis of the three dimensional geometry of at least one section of the contact lens obtained in step i), and
iii) comparing the theoretical wavefront obtained in step i) and the measured wavefront obtained in step b) and calculating a parameter of deviation of the calculated wave front from the measured wavefront in the at least one section of the contact lens (1), the parameter of deviation being an indication of the accuracy of the determined refractive index (n), and
iv) incrementally adjusting the approximated refractive index (n) and reiterating the steps i) to iii) until the parameter of deviation passes a predetermined threshold value.

In yet some further embodiment of the apparatus according to the invention, the wavefront sensor is a Shack-Hartmann wavefront sensor comprising a plurality of lenslets placed in front of the sensor array and wherein the beam of light is directed through the contact lens, through the plurality of lenslets, and onto the sensor array.

Yet in accordance with another aspect of the apparatus according to the invention, the lens holder is a cuvette for holding the contact lens and the cuvette has a concave inner surface.

According to a further aspect of the apparatus according to the invention, the optical coherence tomography system has a measuring light beam having a wavelength different from the wavelength of the beam from the light source of the Shack-Hartmann wavefront sensor.

The method and apparatus according to the invention may be employed to determine very accurately the refractive index of the material of the contact lens. The contact lens can be a spheric or aspheric contact lens and may even be a multifocal or toric contact lens. The contact lens may be manufactured from the common contact lens materials, including silicone hydrogels, in particular contact lenses with high wettability. The method may be performed on hydrated or on unhydrated contact lenses. In order to obtain physical properties which reflect the refractive index of the contact lens in use, determination of the refractive index of the hydrated contact lens is preferred.

Optical Coherence Tomography (OCT) is an established medical imaging method and uses light of relatively short coherence length which is applied to a scattering sample, and with the aid of an interferometer the distances to scattering points of the sample is measured. The scattering sample is scanned point by point and from the resulting interference patterns in the interferogram a high resolution image of the scanned sample may be deduced. From the evaluation of the interference pattern a three-dimensional geometry of the contact lens may be computed by scanning the whole contact lens.

The light source is adapted to the use in the optical coherence tomography. In particular, a low coherence light source emitting a low coherence light beam is used as light source. The low coherence light beam may, for example, be generated by a superluminescent diode (SLD). A laser may also be used as light source.

In order to improve the signal-to-noise ratio in the method for inspecting a contact lens, using optical coherence tomography the sample light beam may be provided from a light source having a wavelength in the near infrared (NIR) region of the electromagnetic spectrum.

From the evaluation of the interference pattern, a three-dimensional image of the contact lens may be computed (so called c-scan). For the achievement of a corrected mechanical model of the contact lens the raw data resulting from the evaluation of the interference pattern may be subjected to an inverse raytracing.

By the application of a simulation method such as, e.g. inverse raytracing, which may also be designated as Dewarping, a mechanical model of the contact lens may be determined which may be represented by CAD data. By an application of OCT in a first step a 3-D image (c-scan) of the contact lens may be obtained. The 3-D image corresponds to points of increased intensity within a scanned volume. By a process called segmentation the 3-D image of the contact lens may be separated from the scanned volume. In order to compensate optical distortions which result from the optical power of the contact lens the image data are subjected to a Dewarping process, such as, e.g. inverse raytracing. The result is a corrected mechanical model of the contact lens, which may be represented by CAD data. Such methods are well known in the art.

A wavefront sensor is a device for measuring the optical aberrations of an optical wavefront. This is accomplished by measuring the irradiance and phase distribution of the light beam at a particular plane in space. Although there are a variety of wavefront sensing technologies, in particular a Shack-Hartman Wavefront Sensor, which is capable of measuring both irradiance and phase distributions in a single frame of data. The Shack-Hartmann sensor includes a microlens array and an image sensor. When light is passing through a contact lens, the light having passed through the contact lens has a wavefront engendered by the lens geometry.

The wavefront can be readily measured by detecting the light having passed through the contact lens with a Shack-Hartmann sensor.

When the light having passed through the contact lens is incident on the microlens array of the Shack-Hartmann sensor, a spot image including a plurality of spots are formed on the image sensor. The spot image is captured, and the positions of the spots are detected. Incident angles of light rays incident on respective microlenses are calculated from the detected spot positions, and data of the wavefront of the object light can be readily calculated from the incident angle distribution of the light rays.

The use of the 3-dimensional data from the optical coherence tomography leads to particular high accuracy of the determination of the refractive index of the material of the contact lens.

The determination of the refractive index of the material of the contact lens yields high accuracy when the measurement of the wavefront and of the geometry by optical coherence tomography includes the optical zone of the contact lens which is responsible for optically affecting the eye's vision.

The use of the lensmaker's equation for the determination of the refractive index is a particular practical and simple embodiment of the present invention. The lensmaker's equation may be adapted to the lens geometry, if necessary, in case the lens geometry is not simply spherical. In this case, the lensmaker's equation may be substituted by a model, which matches the geometry of the contact lens, at least in the measured section of the contact lens, particularly the optical zone. In case of necessity, e1) obtaining the data of the contact from the optical coherence tomography system lens for the lensmaker's formula is performed by a calculation using an approximation of the refractive index, e2) calculating the theoretical wavefront of the light having passed through the contact lens on basis of the data from the optical coherence tomography of the contact lens obtained in step e1) using the lensmaker's formula, e3) comparing the theoretical wavefront obtained in step e2) and the measured wavefront obtained in step b) and calculating a parameter of deviation of the theoretical wave front from the measured wavefront in the at least one section of the contact lens, the parameter of deviation being an indication of the accuracy of the determined refractive index, e4) incrementally adjusting the approximated refractive index and reiterating the steps e1) to e3) until the parameter of deviation passes a predetermined threshold value.

Determining the 3-dimensional geometry of the contact lens and calculating a theoretical wavefront which is then compared to the measured wavefront allows for very flexible use of the method allowing for particularly accurate determination of the refractive index of the material of the contact lens, as the geometry of each contact lens measured is determined individually. Hence the refractive index of the material of the contact lens of various contact lens geometries, including multifocal and toric contact lenses, may be determined and high accuracy of the determination obtained by very precise determination of the geometry.

The measurement of the wavefront and of the geometry of the contact lens in the same lens holder allows for a simple and reliable method, which is further enhanced by simultaneous measurement of the wavefront and of the geometry of the contact lens, as the contact lens underlies minimal motion during the measurement steps and from one measurement step to the other.

Advantages were already described for the method for determining the refractive index of a material of a contact lens and apply to the apparatus for determining a refractive index of a material of a contact lens in an analogous way.

The afore-mentioned embodiments are practical embodiments of determining the refractive index of the material of the contact lens of a contact lens.

It is to be noted, that every individual feature described herein as well as all combination of two or more of such features are possible as long as such features are not mutually exclusive or are otherwise technically incompatible.

Further embodiments and advantages become apparent from the following description of detailed embodiments of the method and system according to the invention with the aid of the drawings.

BRIEF DESCRIPTION OF THE DRAWINGS

Further details and advantages of the invention will become apparent from the following description of exemplary embodiments of the invention with the aid of the drawing, in which:

THE FIGURE shows a schematic diagram of a contact lens measurement apparatus in accordance with one embodiment of the invention.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

In the drawings, like reference numerals have been used throughout to designate identical elements. In the following disclosure, the present invention is described in the context of its use as a method and apparatus for measuring the refractive index of contact lenses.

THE FIGURE shows a schematic view of an embodiment of a method and apparatus for determining the refractive index n of a material of a contact lens according to the invention. The apparatus 100 comprises an optical coherence tomography system and a wave front sensor system. The optical coherence tomography system includes a low-coherence light source 300, a lens 310 for forming a collimated light beam and an interferometer 320. The interferometer comprises a beam splitter 321 receiving the collimated light beam from the light source 300 and dividing the light beam into a reference beam and a sampling beam. A reference arm includes a reference mirror 330 and receives a reference beam from the beam splitter 321 of the interferometer 320 and returns reflected reference light signals to the beam splitter 321. The contact lens inspection system 100 further comprises a sampling arm receiving a sampling beam from the beam splitter 321 of the interferometer 320 and simultaneously scans the sampling beam onto the contact lens 1 in a cuvette 2.

The beam splitter 321 in the interferometer 320 further receives and combines the reflected reference light signal 331 from the reference arm and reflected sampling light 341 signal returned from the contact lens 1 to generate an interference signal 351 comprising an interferogram based on the reflected reference light signal 331 and sampling light signal 341.

The interference signal 351 is then guided over a detector arm including a camera 350 comprising an objective lens 352 and an electronic sensor 353, for example a CCD-sensor or CMOS-sensor. The electronic sensor 353 is configured to obtain the interference signal from the beam splitter 321 and to generate an output signal convertible into digitalized optical coherence tomography data of at least part of the contact lens.

The signal generated by the camera 350 is then analyzed by an electronic analyzer configured to electronically analyze said optical coherence tomography data of said at least part of the contact lens 1 comprising the 3 dimensional geometry of the lens for the at least part of the lens. Additionally, the analyzer is configured to calculate the theoretical wavefront of the light having passed through the contact lens in at least one section S comprising the optical zone of the contact lens using a simulation on basis of the geometry of at least part of the lens and an approximation of the refractive index n using an algorithm executed by the analyzer. In particular, the simulation of the theoretical wavefront is done by ray tracing software (wavefront simulation) well known in the art.

The light source 300 is arranged on top of the container 2, and illuminates the soft contact lens 1 with a low-coherence light beam 311 which has been collimated by a collimation lens 310. Depending on the light source, no collimation lens 310 is necessary. The soft contact lens 1 may be supported inside the container 2, on the concave inner surface of the container bottom 21.

The camera 350 is connected via a data line with the analyzer. In the analyzer, either a portion of the digitalized optical coherence tomography data of the soft contact lens 1 or the entire digitalized optical coherence tomography data of the contact lens is electronically analyzed, for example sequentially, in sections of a predetermined size, and the 3 dimensional geometry of at least part of the contact lens is detected.

Using this apparatus 100, the shape of the contact lens 1 can be determined, ie. the top and bottom surface profiles of each of the outer surfaces of the contact lens 1.

The apparatus 100 additionally comprises a Shack-Hartman wavefront sensor 4. The contact lens 1 may be supported inside the container 2 on the concave inner surface of the container bottom 21 transparent to the light from the wavefront beam 41 of the Shack-Hartman wavefront sensor impinging thereon.

The optical coherence tomography includes using light of relatively short coherence length which is applied to a scattering sample, and with the aid of an interferometer the distances to scattering points of the sample is measured. The scattering sample is scanned point by point and from the resulting interference patterns in the interferogram a high resolution image of the scanned sample may be deduced. From the evaluation of the interference pattern three-dimensional data of the contact lens may be computed by scanning the whole contact lens. Part of the contact lens, in particular including the optical zone is however sufficient for the determination of the refractive index n of the lens material.

The light source 40 of the Shack-Hartmann wavefront sensor system 4 is configured to emit a wavefront light beam 41 directed parallel to the low-coherence light beam 341 of the optical coherence tomography system, through a plurality of lenslets 42, and to a sensor array 43. The wavefront sensor 4 is adapted to measure wavefront deviations due to the presence of the contact lens 1.

During operation, an analyzer, which may be a computer, analyzes data obtained by the wavefront sensor 4 and optical coherence tomography system to determine the refractive index n of the contact lens 1.

In optics, the term waveform is used to denote the amplitude and phase of a light beam as a function of time and position. The wavefront of a light beam is defined as the locus of points having the same optical phase. The wavefront of a light beam can be defined as the virtual surface defined by the points on all possible rays in a light beam having equal optical path length from a spatially coherent source. As examples the wavefront of light emanating from a point light source is a sphere, and the wavefront created by an ideal collimating lens mounted at its focal length from a point source is a plane.

Referring again to THE FIGURE, the Shack-Hartman Wavefront Sensor 4 includes a microlens array 42 for dividing a wavefront 44 (light having passed through the contact lens) to produce a plurality of spots, and a CCD camera 43 for capturing a spot image of the generated spots. The Shack-Hartmann sensor 4 also includes a calculation unit for calculating the wavefront 44 of the light having passed through the contact lens 1 on the basis of the spot image received from the CCD camera 43. The sensor element 43 is not limited to the CCD camera, and may instead be, for example, a CMOS camera. From this information, the overall wavefront can then be reconstructed. It is not necessary that the calculation unit be a portion of the Shack-Hartmann sensor 4, and may be included in the computer that receives the output from the Shack-Hartmann sensor 4 and of the optical coherence system 3 and executes the analysis of the data provided.

In order to allow concurrent operation of the optical coherence tomography and the Shack-Hartman Wavefront Sensor 4 the low-coherence light beam 341 of the optical coherence tomography and the wavefront light beam 41 should be in distinctly different wavelength regions of the optical spectrum. However, such measurement may be performed in subsequent steps.

As described previously, the three dimensional geometry of the contact lens is obtained using an approximated refractive index n. This approximated three dimensional geometry is then used for simulating a theoretical wavefront by ray tracing. The theoretical wavefront being based on the three dimensional geometry, which in is based on the data from the optical coherence tomography using the (approximated) refractive index n, the calculated theoretical wavefront in turn depends on the refractive index n. This theoretical wavefront is then compared to the wavefront measured by the Shark-Hartmann sensor. In case of deviation, the refractive index is incrementally adapted and the steps reiterated until the theoretical wavefront sufficient matches the measured wavefront (expressed by a parameter of deviation), hence satisfactory precision is obtained for the refractive index.

Alternatively to the ray tracing, the refractive index n can be calculated from the lensmaker's equation for contact lenses having a first spherical surface and a second spherical surface $$\frac{1}{f} = (n-1)\left[\frac{1}{R_1} - \frac{1}{R_2} + \frac{(n-1)d}{nR_1R_2}\right]$$

where
f is the focal length of the lens,
n is the refractive index of the lens material,
$R_1$ is the radius of curvature of the lens surface closer to the light source,
$R_2$ is the radius of curvature of the lens surface farther from the light source, and
d is the thickness of the lens (the distance along the lens axis between the two surface vertices).

This equation may be adapted depending on the complexity of the contact lens geometry. For example, the equation may be adapted to a geometry which has a combination of more than one spherical surfaces.

The optical coherence tomography allows for deducing the radii of curvature of the first surface and of the second surface as well as the thickness of the contact lens and from the deviation of the wavefront, depending on the focal length of the contact lens, the refractive index n of the lens material is determined according to the lensmaker's equation.

Although the apparatus and examples have been described herein as including a Shack-Hartmann wavefront sensor Shack-Hartman Wavefront Sensor, it is to be understood that other types of wavefront sensors may be utilized in the apparatus shown in THE FIGURE.

Although the invention has been described with the aid of specific embodiments, it is evident to the person skilled in the art that this embodiment has been described by way of example only, but representing the general inventive concept, and that various changes and modifications can be made without departing from the technical teaching underlying the invention. Therefore, the invention is not intended to be limited by the embodiment described, but rather is defined by the appended claims and their equivalents.

The invention claimed is:

1. A method for determining the refractive index (n) of a material of a contact lens (1), the contact lens (1) having a first surface and a second surface defining a lens geometry there between, the method comprising the steps of:
 a) providing a lens holder (2) comprising an optically transparent bottom (21) and containing the contact lens (1),
 b) providing a wavefront sensor (4), the wavefront sensor (4) comprising a light source (40) and a detector (43) for receiving light coming from the light source (40) and having passed through the contact lens (1) contained in the lens holder (2) and impinging on the detector (43), thus generating signals at the detector (43) measuring the wavefront issued by the contact lens (1) with the wavefront sensor (4),
 c) providing an optical coherence tomography system (3) and obtaining data of a geometry of at least one section of the contact lens (1) with the optical coherence tomography system (3),
 d) communicating the measured wavefront from the wavefront sensor (4) and the data of the geometry of the at least one section of the contact lens from the optical coherence tomography system (3) to an analyzer (5),
 e) determining the refractive index (n) of the material of the contact lens from the data of the geometry of the at least one section (S) of the contact lens (1) and from the wavefront issued by the contact lens (1).
 wherein determining the refractive index (n) of the material of the contact lens in step e) comprises the steps of:
 e1) obtaining the three dimensional geometry of the at least one section of the contact lens (1) by performing a calculation using an approximation of the refractive index (n),
 e2) calculating the theoretical wavefront of the light passing through the contact lens in the at least one section of the contact lens (1) on basis of the three dimensional geometry of the at least one section of the contact lens (1) obtained in step e1) using a wavefront simulation,
 e3) comparing the theoretical wavefront obtained in step e2) and the measured wavefront obtained in step b) in the at least one section and calculating a parameter of deviation of the theoretical wave front from the measured wavefront in the at least one section (S) of the contact lens (1), the parameter of deviation being an indication of the accuracy of the determined refractive index (n),
 e4) incrementally adjusting the approximated refractive index (n) and reiterating the steps e1) to e3) until the parameter of deviation passes a predetermined threshold value.

2. The method according to claim 1, wherein in step e) a three dimensional geometry of the at least one section of the contact lens (1) is obtained from the data of the geometry from the optical coherence tomography system and an approximated refractive index (n) of the material of the contact lens, for determining the refractive index (n),
 wherein determining the refractive index (n) of the material of the contact lens in step e) comprises the steps of:

e1) obtaining the three dimensional geometry of the at least one section of the contact lens (1) by performing a calculation using an approximation of the refractive index (n), e2) calculating the theoretical wavefront of the light passing through the contact lens in the at least one section of the contact lens (1) on basis of the three dimensional geometry of the at least one section of the contact lens (1) obtained in step e1) using a wavefront simulation, e3) comparing the theoretical wavefront obtained in step e2) and the measured wavefront obtained in step b) in the at least one section and calculating a parameter of deviation of the theoretical wave front from the measured wavefront in the at least one section (S) of the contact lens (1), the parameter of deviation being an indication of the accuracy of the determined refractive index (n), e4) incrementally adjusting the approximated refractive index (n) and reiterating the steps e1) to e3) until the parameter of deviation passes a predetermined threshold value.

3. An apparatus for determining a refractive index (n) of a material of a contact lens (1), the apparatus comprising:

a) an optical coherence tomography system (3) configured to obtain data of a geometry of the contact lens (1);

b) a wavefront sensor (4) comprising a light source (40) and a sensor array (43), the light source (40) being configured to emit a beam of light (41) which is directed through the contact lens (1) and onto the sensor array (43), the wavefront sensor (4) being adapted to measure a wavefront of the light beam (41) having passed through the contact lens (1), and c) an analyzer (5), configured to determine the refractive index (n) of the material of the contact lens from the data of the geometry of the contact lens (1) and from the wavefront of the light beam having passed through the contact lens (1), wherein the analyzer (5) is configured to determine the refractive index (n) of the material of the contact lens (1) by i) obtaining a three dimensional geometry of the at least one section of the contact lens (1) by performing a calculation using an approximation of the refractive index (n), ii) calculating the theoretical wavefront of the light having passed through the contact lens (1) in the at least one section of the contact lens (1) using a simulation on basis of the three dimensional geometry of at least one section of the contact lens (1) obtained in step i), iii) comparing the theoretical wavefront obtained in step i) and the measured wavefront obtained in step b) and calculating a parameter of deviation of the calculated wave front from the measured wavefront in the at least one section of the contact lens (1), the parameter of deviation being an indication of the accuracy of the determined refractive index (n), and iv) incrementally adjusting the approximated refractive index (n) and reiterating the steps i) to iii) until the parameter of deviation passes a predetermined threshold value.

4. The apparatus according to claim 3, wherein the wavefront sensor is a Shack-Hartmann wavefront sensor (4) comprising a plurality of lenslets (42) placed in front of the sensor array (43) and wherein the beam of light (41) is directed through the contact lens (1), through the plurality of lenslets (42), and onto the sensor array (43).

* * * * *